US005364439A

United States Patent [19]

Gallup et al.

[11] Patent Number: 5,364,439

[45] Date of Patent: Nov. 15, 1994

[54] METHOD TO TREAT GEOTHERMAL FLUID STREAMS

[75] Inventors: Darrell L. Gallup, Chino Hills; Kevin R. Kitz, El Cerrito; Manuel E. Obando, Whittier; Donald M. Fenton, Anaheim; Paul A. Peaden, Fullerton; Dennis L. Saunders, Yorba Linda; Brian J. Kelly, Corona, all of Calif.

[73] Assignee: Union Oil Company of California, Los Angeles, Calif.

[21] Appl. No.: 875,344

[22] Filed: Apr. 29, 1992

[51] Int. Cl.[5] .......................... C05C 3/00; C01C 1/00; C01B 17/02; B01D 53/34

[52] U.S. Cl. .......................................... 71/57; 71/61; 423/237; 423/573.1; 423/DIG. 19; 423/210; 423/220

[58] Field of Search ....... 423/210, 220, 242, DIG. 19, 423/573.1, 237; 71/57, 61

[56] References Cited

U.S. PATENT DOCUMENTS

| | | | |
|---|---|---|---|
| 4,259,300 | 3/1981 | Lieffers | 423/DIG. 19 |
| 4,528,169 | 7/1985 | LaMori et al. | 423/DIG. 19 |
| 4,574,076 | 3/1986 | Castrantas | 423/DIG. 19 |
| 4,710,305 | 12/1987 | Allison et al. | 210/747 |
| 4,978,457 | 12/1990 | Gallup et al. | 210/747 |
| 5,024,769 | 6/1991 | Gallup | 210/721 |
| 5,028,340 | 7/1991 | Gallup | 210/753 |
| 5,032,284 | 7/1991 | Gallup et al. | 210/697 |
| 5,061,373 | 10/1991 | Gallup | 210/697 |

OTHER PUBLICATIONS

"Removal of Toxic Metals From Power Generation Waste Streams by Adsorption and Co-Precipitation", Mark M. Benjamin, Kim F. Hayes, James O. Leckie, pp. 281–292, Proceedings Industrial Waste Conference, vol. 35, published 1981.

"Agricultural Uses of Excess Steam Condensate-Salton Sea KGRA", Darrell L. Gallup, Geothermal Resource Council Transactions, vol. 15, 1991, pp. 63–68.

Li et al., "Removal of Hydrogen Sulfide from Geothermal Stream", pp. 1–4, Battelle Pacific Northwest Lab., 1976.

*Primary Examiner*—Ferris Lander

*Attorney, Agent, or Firm*—Gregory F. Wirzbicki; William O. Jacobson

[57] ABSTRACT

An integrated system of non-condensable gas (NCG) and condensate treatment allows geothermal power plant condensate and non-condensable gas effluent streams containing $H_2S$ and ammonia to be commercially useful for more than for cooling tower makeup. In the preferred embodiment, the pH of the condensate is increased by adding ammonia and the pH increased stream is contacted with NCG to scrub and oxidize the $H_2S$ constituent of the NCG. By reducing the pH, the condensate or aqueous stream mixture can also be used to further transfer ammonia from the non-condensable gas stream to the aqueous stream, enriching the stream for use as a fertilizer/irrigation water mixture. If other commercial uses are desired for the mixture and/or oxidized NCG streams, they can be resin treated to remove the ammonia constituent. With the ammonia and $H_2S$ constituents decreased, the condensate may be used for a variety of applications and the NCG can be injected or used as a commercial feed stream. Rejuvenation of the resin may be accomplished by recycling and purging with the treated NCG. The effluent purge gas may be used to further enrich irrigation waters. A nearly total elimination of all emissions from the geothermal power is thereby made possible.

27 Claims, 2 Drawing Sheets

REACTANT 5 STEAM 2 NCG (V) (V) MIXER 3 7 16 (V) REACTANT 35 36 32 ADSORBENT 33 37 38 (V) $CO_2$ FEED (V) BLANKETING FEED 39 (V) INJECTION 40 (V) PURGE

COOLING TOWER DISCHARGE (L) 6 17 REACTANT (V–L) (L) 39 PURGE WATER (V) 4 18 SURFACE WATER (L) (V) (V) REACTANT 15

CONDENSATE (L) P 10 MIXER 8 REACTANT 13 14 19 MIXER–PACKED COLUMN 41 34 42 (L) IRRIGATION FEED 23 22 (L) SPECIAL IRRIGATION FEED

COOLING TOWER DISCHARGE (L) 11 12 REACTANT (L) (L–V) REACTANT 20 21 ADSORBENT 21a REACTANT 25 (L) POTABLE WATER FEED 31 REACTANT 26 (L) PURGE WATER FEED GROUND OR SURFACE WATER (L) 24 29 REACTANT 27 (L) SEAL WATER FEED 30 REACTANT 28 (L) COOLING TOWER MAKE UP 9 ADDITIVE

METHOD TO TREAT GEOTHERMAL FLUID STREAMS

FIELD OF THE INVENTION

This invention relates to vapor and aqueous stream treatment processes. More specifically, the invention provides an integrated process for removing unwanted constituents from contaminated aqueous and vapor streams, especially effluent streams from a geothermal power plant. The process produces commercially useful streams, such as water suitable for irrigation and a $CO_2$ stream suitable for injection into an underground formation.

BACKGROUND OF THE INVENTION

Subterranean reservoirs of aqueous geothermal fluids—such as steam and/or hot brine—exist in many regions of the world. Such geothermal fluid reservoirs can contain vast amounts of thermal energy.

Many of the serious problems associated with the production and use of geothermal fluids can be attributed to the unusually complex chemical composition of these geothermal fluids. The aquifer conditions also tend to leach large amounts of salts, minerals, and other elements from the formations into the geothermal fluids. The concentration of these elements leached into the geothermal fluids tends to reach saturation levels. This tendency results from the extended periods of time the hot geothermal fluids have been in contact with the materials of the formation. The acid gases (e.g., $CO_2$ and $H_2S$) typically present may also help to dissolve even more contaminants in these geothermal fluids.

To generate power in a geothermal power plant from geothermal brines at a reservoir temperature of over about 400° F. and pressures above 400 psig, brines are typically flashed to a reduced pressure. Flashing converts some of the liquid water constituent of the brine into steam. The steam has been used in generally conventional steam. turbine-type power generators to generate electricity, e.g., in New Zealand. Steam used for power production typically contains volatile or other contaminants, e.g., brine carry-over, $H_2S$, and ammonia.

Whether the steam is derived directly from the geothermal resource or from flashed brine, after discharge from the power plant turbine, the contaminated steam is typically condensed in a water cooled surface condenser supplied by an evaporative cooling tower. A direct contact condenser may be used if feasible, e.g., if contamination of the cooling water can be accepted. Liquid condensate and a non-condensable gas (at condenser conditions) are the effluents typically produced in the surface condenser.

The volatile contaminants of the steam are, after condensation, partitioned between the condensate and non-condensable gas (NCG) streams. The portions of the volatile contaminants partitioned into the condensate and gas streams depend upon the geometry of the condenser and fluid property (e.g., temperature and pressure) conditions within the condenser.

The partitioning and other operating conditions cause the compositions of the NCG and condensate streams from these geothermal fluids to contain variable amounts of contaminants. The contaminants may cause both the condensate and NCG streams from the condenser to be corrosive, and in certain cases, they also may be toxic. The corrosive and toxic contaminants tend to make thence condenser effluent liquids and gases commercially unusable outside of the power plant.

The contaminated condensate stream is typically used in the power plant's cooling tower as a makeup to compensate for the evaporation loss of coolant water. This evaporation causes dissolved solids in the cooling water to be concentrated, and blowdown by discharge of the cooling water is required to remove dissolved solids, thus prevent undesired precipitation of solids in the cooling tower system.

The blowdown stream is most commonly disposed of by injection into a geothermal formation or by discharge to surface water (possibly after treatment to comply with environmental discharge regulations). Injection avoids treatment of the blowdown stream or contamination of surface waters and may also replenish the geothermal aquifer from which the geothermal fluid was produced. Injection may be especially important to avoid treatment costs when larger amounts of contaminated blowdown are involved.

The atmospheric disposal of the NCG stream produced in the geothermal power process may also present problems. Although $CO_2$ is typically the primary constituent of these gases, ammonia and hydrogen sulfide are also common constituents. These constituents may present environmental, corrosion, and other handling problems. Prior art treatment of these constituents requires removal of these constituents prior to discharge to the atmosphere.

In addition to non-condensable gases (NCG) separated during the flash process, corrosion and emission of gases from cooling tower waters (when the cooling tower makeup fluid source is contaminated condensate) are further problems. Gases emitted from the cooling tower can include $H_2S$, $NH_3$, $SO_2$, and $NO_2$. The $NO_2$ may be formed by the oxidation of ammonia in the cooling water by naturally occurring bacteria. $SO_2$ may also be generated by microorganisms, and the dissolved gases can be corrosive. Nitrites can also be formed and produce acids corrosive to the cooling tower system and injection well disposal piping.

To overcome these and other problems in cooling tower systems, inhibitors or other additives are commonly added to the cooling water. Heavy metal inhibitors have been effective in other cooling tower applications for controlling the growth of organisms and the emissions they cause, since these inhibitors are toxic to the organisms. However, multi-function, heavy metal inhibitors tend to form heavy metal sludges which are now classified as a toxic or hazardous waste material in many localities. Consequently, the disposal of these sludges is difficult and expensive.

Non-heavy metal (corrosion) inhibitors, such as phosphate-types, have recently been used in some condensate handling systems. These phosphate materials do not tend to form hazardous waste materials in the presence of ammonia, carbon dioxide, and/or hydrogen sulfide. However, unlike their counterpart heavy metal inhibitors, phosphate-type inhibitors have not been as effective in inhibiting corrosion, microorganism growth, and emissions.

In summary, many effluent streams from a geothermal power plant need to be treated, specifically including 1) contaminated condensate, 2) cooling tower blowdown, 3) NCG, and 4) vapor emissions from a cooling tower. Indeed, the treatment of the $H_2S$ constituent of NCG has required significant capital and operating investments in many prior art geothermal power plants.

SUMMARY OF THE INVENTION

The present invention provides an integrated system of NCG and condensate treatment to produce commercially useful vapor and liquid streams. The integrated process treats contaminated geothermal condensate by increasing the pH first by adding a reactant or additive such as ammonia, and then mixing an aerated water with the condensate and/or NCG gas streams to scrub and oxidize the $H_2S$ from the NCG stream and oxidize the $H_2S$ constituent in the water phase. This is followed by detecting the ammonia constituents in the condensate and, depending upon use, adsorption to remove excess ammonia and/or enrichment of the ammonia content for fertilizer and irrigation use. If additional ammonia is needed for the desired use, re-mixing a primarily $CO_2$ but still ammonia-containing NCG stream portion with the $H_2S$ stripped condensate tends to lower the pH (and additional acid can be injected to further lower the pH if needed). Contacting the NCG with the lower pH condensate (possibly mixed with surface water) can transfer some ammonia from the NCG stream to produce a further enriched aqueous stream and a more usable (and purified) NCG stream. Biocide and pH modifying additives can further control treated stream contaminants, if sensing and end use indicates the need.

The removal of $H_2S$ from the NCG stream is typically accomplished by contacting the NCG with condensate that has had the pH raised to at least about 8.4 units, if required, and further contacting with a reactant such as an oxidant to react with (oxidize) the transferred (scrubbed) $H_2S$. One embodiment of this process is described in U.S. Pat. No. 5,028,340, issued Jul. 2, 1991 (Gallup), which is herein incorporated in its entirety herein by reference.

The $H_2S$ stripped, but still ammonia-containing non-condensable gases can be contacted with an ammonia-adsorbent, such as a resin or sieve, to decrease or remove the ammonia constituent, creating a treated NCG stream. As the ammonia removal rate declines, the adsorbent may be rejuvenated by periodically pressurizing and recycling a portion the treated NCG stream (primarily $CO_2$) through the adsorbent and using the regenerant to further enrich crop-irrigating water.

The ammonia-containing gases (or a portion of the gases) can also be bubbled through a portion of the $H_2S$ reacted condensate and/or water mixture to create an enriched water. The bubbling (typically under decreased pH and temperature conditions) transfers the ammonia from the gas stream to the water, producing an ammonia-enriched water. The enriched water is especially useful for irrigation of crops, shown as "irrigation feed" in FIG. 1, replacing prior art anhydrous ammonia injections into irrigation water when nitrogen fertilization of crops is needed. The non-condensable gas stream, shown as a vapor stream from mixer 15 and the vapor discharged from adsorbent vessel 32 in FIG. 1, consists essentially of $CO_2$ and may also be commercially useful.

In another embodiment, the cooling water derived from geothermal condensate is reacted with a biocide in a process as described in U.S. Pat. No. 5,032,284, issued on Jul. 16, 1991 (Gallup et al.), and U.S. Pat. No. 5,061,373, issued on Oct. 29, 1991 (Gallup), which are incorporated in their entirety herein by reference. The biocide tends to react with both the ammonia and dissolved $H_2S$ in the condensate. When combined with chlorination and boron monitoring and control if needed, the treated condensate may be commercially substituted for drinking water or other treated water applications.

Still further, other portions of the treated condensate can be used to dilute contaminated water sources, such as high saline content ground water, to produce a potable or other commercially useful water. Mixing the treated low salinity condensate with the ground water typically reduces salinity (when compared to the ground water), boron and other contaminants (when compared to the condensate). Further treatment can further reduce these contaminants and remove other contaminants in the mixture. The treated mixture may meet drinking water standards, even though each feed stream, by itself, could not.

DETAILED DESCRIPTION OF THE INVENTION

Figure 1:
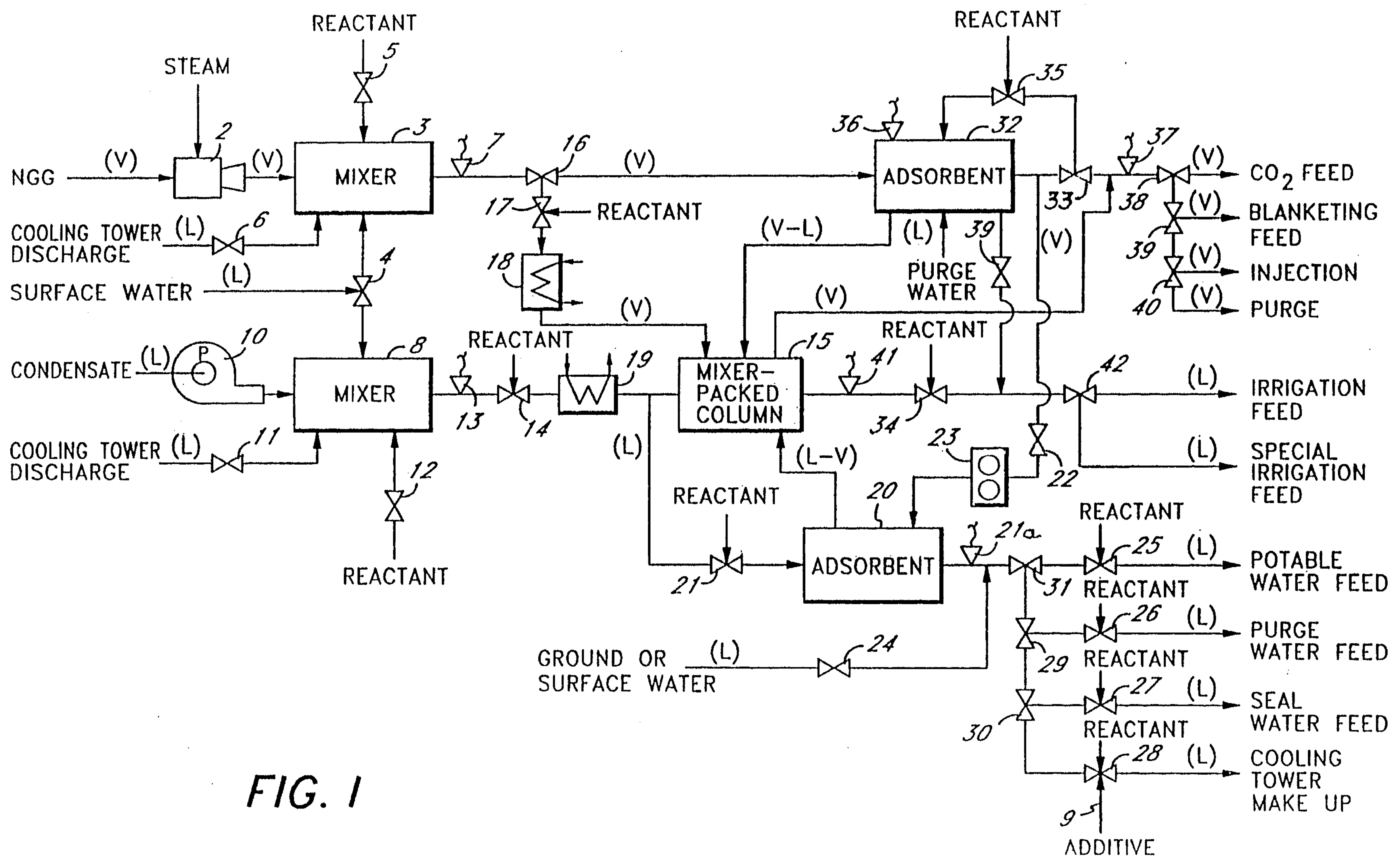
FIG. 1 shows a schematic of a process for treating the fluid streams emanating from a geothermal flash process.

FIG. 1 shows a process schematic of a treatment process for most of the effluent fluid streams emanating from a geothermal power plant. Effluent fluid streams that are primarily liquid are labelled as "(1)", those that are primarily vapor are labelled as "(v)" and those that are typically mixtures of both vapor and liquid (or liquified vapors) are labelled as "(1-v)."

A first stream, labelled "NCG" in FIG. 1, is typically at sub-atmospheric pressure and is a mostly vapor phase stream composed primarily of non-condensed (or non-condensable) gases. This NCG stream is typically derived from the condensing of geothermal steam (which may have been derived from flashing a geothermal brine) after the steam has been used in a geothermal power plant to power a turbine. Since the steam so condensed often contains a number of non-condensable gases, e.g., $CO_2$, $H_2S$ and ammonia, these gases together with residual water vapor generally comprise the NCG stream. The NCG stream is typically removed from the top of the shell side of a surface (i.e., shell-and-tube) condenser under vacuum conditions. Condenser cooling water is typically supplied to the tube side from an evaporative cooling tower.

The NCG stream is first pressurized, usually by an ejector 2 driven by geothermal "steam" (as shown in FIG. 1). Because of pressure increase limitations of steam ejectors, several stages or a series of ejectors may be required to raise the NCG stream pressure to greater than atmospheric pressure, including intermediate cooling and condensation of the motive steam after each stage. Vacuum pumps or other means to increase pressure of the NCG stream may also be used instead of the ejector(s) 2.

The pressure of the NCG stream is raised using steam ejector 2 (or other blower, pump or compressor) so that treatment to remove $H_2S$ (or other) constituents may be accomplished under atmospheric or greater pressure instead of condenser vacuum conditions. In addition to removing the $H_2S$ contained in the NCG stream, further removal of $H_2S$ supplied as a constituent of the motive geothermal "steam" (pressurizing the NCG stream) may be required. Although the pressure downstream of the ejector 2 (or series of ejectors) is typically only somewhat above atmospheric, it may range up to about 100 psig (7.8 atmospheres) but more commonly is less than 30 psig (3.04 atm). A post-ejector condenser may also be provided, if required to remove excessive water vapor (from the steam) prior to further treatment.

The primary contaminants of concern in the NCG stream are $H_2S$ and ammonia. The concentration of $H_2S$ in the NCG may range from 3000 to 7000 ppm, by weight, but more typically ranges from 3500 to 6000 ppm. The concentration of ammonia in the NCG may range from nearly 0 to 500 ppm, by weight, but more typically ranges from 10 to 100 ppm.

The water vapor constituent of the geothermal steam is typically condensed and removed from the bottom of the shell side of a surface condenser. The resulting liquid stream, labelled as "condensate" in FIG. 1, is primarily condensed water vapor drained from the condenser. However, the condensate is also usually contaminated with dissolved non-condensable gases, in particular, $CO_2$, $H_2S$, ammonia.

Another power plant liquid effluent, shown as two streams in FIG. 1, is "cooling tower discharge." The cooling tower discharge, or blowdown, is a portion of cooling water circulating in cooling towers which is removed in order to keep the dissolved solids in circulation below precipitation or acceptable discharge levels. The blowdown typically consists essentially of condensate, which, through evaporation in the cooling tower, has had the concentration of salts and/or suspended solids increased. Total dissolved solids (TDS) in the blowdown stream are typically no more than 4000 ppm, out may be as low as about 1000 ppm.

The concentration of inhibitors or other cooling tower treatment additives in the blowdown is also typically increased by evaporation in the cooling tower. Condensate treatment typically includes addition of a non-heavy metal inhibitor and/or one or more other additives to control corrosion, microorganism growth, and/or unwanted $H_2S$ or other emissions from the cooling tower. Thus, the blowdown waters will contain increased concentrations of these constituents.

A "surface water" stream, as shown in FIG. 1, may be water derived directly from a river, canal, or other surface water source. Surface water may also be a small plant discharge (e.g., waste water) that was originally derived from a surface water source. Surface water, because of the inherent contact with air at the surface of the earth, contains dissolved oxygen in the ppm range, typically less than 10 ppm, more typically about 6 ppm, but usually more than 1 ppm.

The present process decreases or removes the $H_2S$ constituent in the pressurized non-condensable gas (NCG) stream by contacting the NCG stream (in mixer 3) with a reactant, such as an oxidant. For example, the $H_2S$ may be removed by reacting with oxygen in an aerated waters (e.g., surface water or cooling tower discharge introduced by control valves 4 and 6) and/or with oxidizing reactants introduced by control valve 5. The aerated water is typically at a high pH to assist in the removal. After contacting in mixer 3, the water can be drained (drain line not shown for clarity) to a condenser or to a location in the "condensate" stream between the condenser and pump 10.

Surface waters, when contacted with the NCG stream in mixer 3, tend to form ammonium sulfate because of the typical presence of ammonia in the NCG stream. If the treated water is to be used for crop irrigation, the ammonium sulfate is commercially useful as an agricultural fertilizer.

The contacting in mixer 3 scrubs and oxidizes at least a portion of the $H_2S$ constituent of the NCG stream. The $H_2S$ is oxidized to a solid sulfate, which can be separated and removed. Although several sources of reactants to treat $H_2S$ (and other contaminants) are shown and described, such as several oxygen-containing water supplies, a specific process application may be only require one reactant to remove the offending contaminants.

The mixer 3 may also serve as a heat exchanger and/or condenser/separator of the motive steam. Mixer 3 is preferably a vertical packed tower, such as one supplied by Delta Cooling Towers Inc., Vanguard Series, but other types of packed towers, a mixing section of piping, or other mixing/condensing/heat exchanger means may also be used. If a surface water stream is mixed in mixer 3 with the NCG stream, the temperature of the surface water will cause the water vapor constituent of the NCG to condense.

The rate at which surface and/or blowdown water or other reactant, such as an oxidizing biocide, is introduced into mixer 3 is controlled by control valves 4, 5, and 6. The control valves 4, 5, and 6 are controlled by a programmable controller (not shown for clarity) which obtains data from sensor 7. Various off-the-shelf sensors and programmable controllers may be used for this application, but model no. 1000 sensors supplied by Sensidyne and programmable (distributed control system) controllers supplied by Rosemount are preferred. If the data from sensor 7 indicate that an excessive concentration of $H_2S$ remains after mixing in mixer 3, the controller can open any one of control valves 4, 5, and 6, or any combination, providing additional or new "reactants, such as an oxidant," to remove the excess concentration of $H_2S$.

Another possible "reactant" or additive is a biocide. An aqueous biocide solution, as described in U.S. Pat. No. 5,028,340 which is incorporated herein in its entirety, removes $H_2S$ from the "NCG" vapor stream and controls microorganisms.

A reactant, such as a biocide, can be added without pH modification, but an acid or base may be added to achieve a pH which improves the desired reaction. An example is raising the pH by adding ammonia to aerated water and the aqueous mixture used to oxidize $H_2S$, e.g., at control valve 5. An acid may also be an additive to lower the pH of a reactant, e.g., at control valve 28.

An example of pH control is illustrated by the following test data using surface water and NCG streams from a geothermal power plant located near the Salton Sea, Calif. Mixing surface water and NCG streams without any other reactant (or additive) added and a gas-water volume rate ratio of 0.8 in one test showed that mixing a surface water having a pH of 8.4 reduced the $H_2S$ concentration in the NCG stream by about 70 percent. When ammonia alone was added as a reactant (at a location similar to control valve 5), and the pH increased to 10, the $H_2S$ concentration was reduced by 99.9 percent at a gas-water volume rate ratio of 1.3. When ammonia and an oxidizing biocide, trichloroisocyanuric acid, were added, no $H_2S$ could be detected in the NCG stream when the mixture had a pH of 10.2, and a gas-water volume rate ratio of 1.3 was used.

Although calculations to determine the amount of base or acid needed to change the pH of an aqueous stream are well known and stoichiometric amounts of oxidizing reactants can also be calculated, routine experimentation is needed to determine optimum amounts of reactant to be added, such as the amount of aerated cooling water. For example, for each lb of NCG treated, the amount of aerated cooling water discharge can be expected to range from approximately 1,000 to 6,000 lbs (453.6 to 2721.6 kg), usually from 3,000 to 4,000 lbs (1360.8 to 1814.4 kg); the amount of surface water can be expected to range from approximately 1,000 to 6,000 lbs (453.6 to 2721.6 kg), usually from 2,000 to 4,000 lbs (907.2 to 1814.4 kg); the amount of air can be expected to range from approximately 10 to 20 lbs (4.54 to 9.07 kg), usually from 14 to 16 lbs (6.35 to 7.26 kg); and the amount of a reactant such as trichloroisocyanuric acid can be expected to range from approximately 2 to 10 lbs (0.907 to 4.54 kg), usually from approximately 4 to 6 lbs (1.81 to 2.72 kg).

Still another possible reactant added to the pressurized NCG stream via control valve 5 is air. The oxygen in the air reacts with the hydrogen sulfide component to form a primarily solid constituent. The air may be supplanted or augmented by still other reactants. Other possible "reactants" include chlorine, bromine, ozone, hydrogen peroxide, iron chelates, and sulfur dioxide.

The typical flowrate of reactant(s), such as oxidants, needed varies with the concentration of $H_2S$ in the NCG stream, the percent reduction required, the flow rate of the NCG stream, the conditions of the NCG stream, and the eventual use of the treated stream(s). However, simple mixing of typical NCG and oxygenated water streams does not appear to be sufficient to efficiently oxidize all the $H_2S$. Hence, augmentation of aerated water with another reactant and a pH controlling additive is preferred. As a further example of less than full $H_2S$ removal using only simple mixing, a 1400 lb/hr (635 kg/hr) NCG stream at a pressure of approximately 2 atmospheres and at a temperature of approximately 100° F. (82.2° C.) and containing 4500 ppm of $H_2S$ was mixed with a 20,000 lb/hr cooling tower discharge stream containing 6 ppm dissolved oxygen. Although sufficient $H_2S$ was present to react with all of the $O_2$, analysis of the mixture showed less than 50% of the $O_2$ reacted with the large concentration of $H_2S$ present. It is expected that a larger amounts of $O_2$, including greater than stoichiometric amounts, would fail to reduce substantially all of the $H_2S$.

Similar to the above-described removal of $H_2S$ from the NCG stream, the $H_2S$ constituent dissolved in the "condensate" stream may also be removed in a separate mixer 8 (or other mixing means) by adding a "reactant," typically an oxidant, through valve 12. The oxidant or other reactant added to the condensate may again include pH controlled surface water (containing dissolved oxygen) from control valve 4, aerated cooling tower blowdown from control valve 11, air or other reactants from control valve 12. Other reactants for addition via control valve 12 include pH modifiers, iron chelates, oxidizing biocides, hydrogen peroxides, or ozone.

If aerated cooling tower blowdown is used in mixer 8, the inhibitor constituent normally contained in the blowdown stream will also be added to the condensate stream. However, the inhibitor concentration in the blowdown stream of the present invention is substantially less than in prior art (geothermal) blowdown streams. This reduced concentration of inhibitor is caused by the recycling of cooling water discharge and removal of e.g., in mixer 8, in the present invention as hereinbefore described. The $H_2S$ removal and recycling before the inhibitor is added (the latter shown in FIG. 1 as "additive" stream 9 at control valve 28) reduces the need for the inhibitor added to the "cooling tower makeup." Less inhibitor is needed to control $H_2S$ related corrosion and emissions, allowing the inhibitor dosage to be significantly decreased, e.g., by as much as about 50 percent, and/or a less effective inhibitor to be used for the same level of corrosion and emission protection.

The one or more reactants or additives, such as additive stream 9 at control valve 28, may also decrease the previously increased pH of the blowdown (or other aqueous) stream. If ammonia is added to increase the pH during mixing in mixers 3 and/or 8, the pH may need to be reduced before the treated stream is used. However, a separate additive or reactant to lower the pH may not be required since the $CO_2$ in the NCG stream may lower the pH sufficiently in mixer 3.

The treated blowdown (possibly mixed with condensate or other waters) may now be used for irrigation or other productive use rather than discharged to a waste water sump as in the prior art. The commercial use may require a decrease in the number of concentration cycles within the cooling tower, but the decreased cycling will also tend to reduce cooling system maintenance and other problems. In addition, if only a portion of the blowdown can be mixed and recycled, the cooling tower can be cycled to fully concentrated the remainder as before.

The flowrate of cooling water discharge, surface water, condensate, and reactant(s) mixed in mixer 8 is controlled by pump 10 and control valves 4, 11, and 12. Pump 10 is typically required to increase the pressure of the condensate from the condenser (normally under vacuum conditions). Pump 10 and control valves 4, 11, and 12 may be controlled by a programmable controller (not shown for clarity) which obtains data from sensor 13.

Sensor 13 may detect more than just concentrations of $H_2S$ and therefore may be a series of sensors (and controllers). If the data from sensor 13 indicate that excessive concentrations of $H_2S$ and/or other contaminants remain after mixing in mixer 8, additional or new reactants are provided and/or the rate of condensate pumping can be reduced. Various off-the-shelf sensors and programmable controllers may be used for this application, but sensors supplied by Sensidyne as model no. 1000 and programmable controllers supplied by Rosemount (and integrated into a power plant distributed control system) are preferred.

The typical flowrate of oxygen-containing water or other reactant needed to treat the condensate stream varies with the concentration of $H_2S$ in the condensate stream, the flow rate of the condensate stream, pH and other conditions of the condensate stream, and eventual use of the treated stream(s). However as an example, a condensate stream processed at a rate of approximately 90,000 lb/hr (40,824 kg/hr), a pressure of approximately 40 psig (3.72 atmospheres), a temperature of approximately 120° F. (48.9° C), and containing approximately 30 ppm of $H_2S$ would typically be mixed with a 20,000 lb/hr (9,072 kg/hr) cooling tower discharge stream containing 6 ppm dissolved oxygen. This mixing of aerated cooling water represents approximately 10 percent of the stoichiometric amount of oxygen needed to react continuously with the $H_2$ constituent of the condensate.

For each 1*b* (0.4536 kg) of condensate treated, the amount of aerated cooling water discharge needed to substantially reduce $H_2S$ concentrations typically ranges from approximately 0.1 to 1 lbs (0.0454 to 0,454 kg), usually from approximately 0.2 to 0.3 lbs (0.0907 to 0.1361 kg), the amount of surface water typically ranges from approximately 0.1 to 1.0 lbs (0.0454 to 0.454 kg), usually from approximately 0.2 to 1.0 lbs (0.0907 to 0.454 kg), the amount of air typically ranges from approximately 2 to 10 lbs (0.907 to 4,536 kg), usually from about 4 to 6 lbs (1.813 to 2.722 kg), and the amount of reactant, such as trichloroisocyanuric acid (TCIA), typically ranges from about 1 to 5 lbs (0,454 to 2,268 kg), usually from about 2 to 3 lbs (0,907 to 1,361 kg).

If the end use for the treated water is irrigation and the concentration of ammonia sensed at sensor 13 is inadequate for this use, additional ammonia can be introduced. This can be accomplished by increasing the proportion of "condensate" (which typically contains dissolved ammonia) mixed with surface water. Ammonia from another source may also be introduced as a "reactant" at control valve 14 to form additional nitrogen fertilizer, such as ammonium sulfate.

However, when a portion of the treated water is to be used for "irrigation feed," an alternative for enriching the condensate for irrigation use is to contact (e.g, in mixer 15) the $H_2S$-removed, but still ammonia-rich, NCG stream at control valve 16 with the condensate under controlled conditions. Typically, the controls lower the pH of the aqueous stream. The mixer 15 is preferably a packed tower, but other mixing means may also be employed. As the pH, pressure, and temperature conditions change, the solubility of ammonia in the condensate changes. Contacting and mixing at different conditions redissolves some of the ammonia constituent of the NCG in condensate (or condensate mixtures) even though the ammonia constituent of the NCG might have originally been derived from the geothermal fluid at different conditions.

Conditions of the $H_2S$-removed NCG stream and mixed condensate stream are controlled by controlling additives and mixing rates at control valves 14, 16, and 17 and temperature at heat exchangers 18 and 19. These heat exchangers and control valves are controlled by a programmable controller (not shown for clarity) based upon data supplied from sensors 7 and 13. Alternative embodiments may replace the heat exchangers (and heating or cooling fluid supplies) with temperature conditioning equipment or other heating or cooling means.

The typical amount of $H_2S$-removed, but ammonia-containing NCG that must be contacted with the mixed condensate varies. Variables include the amount of ammonia and ammonium ions in the mixed condensate stream, the flow rate of the condensate stream, conditions of the condensate stream, and eventual use(s) of the treated stream(s). However, as an example, a condensate stream of about 90,000 lb/hr (40,824 kg/hr) at a pressure of about 40 psig (3.72 atm) and at a temperature of about 120° F. (48.9° C.) and containing 300 ppm of ammonia is mixed with about a 1400 lb/hr (635 kg/hr) $H_2S$-stripped NCG stream containing 6000 ppm ammonia. This concentration of ammonia represents approximately 30 percent of the stoichiometric amount of ammonia needed to enrich the mixed condensate by a factor of 2. For each lb (0.454 kg) of condensate treated, the amount of $H_2S$-stripped NCG typically ranges from about 0.005 to 0.05 lbs (0.00227 to 0.0227 kg), usually from about 0.01 to 0.02 lbs (0.00454 to 0.0907 kg).

The contacting of the $H_2S$-stripped, but ammonia-rich gas stream with the $H_2S$-stripped water stream produces an ammonia-rich water stream from mixer 15 passing through control valves 34 and 42. The enriched water can replace separate supplies of ammonia fertilizer and irrigation water to agricultural crops.

In addition to transferring the ammonia from the NCG, the contacting of the NCG with the condensate (or aqueous mixtures) in mixer 15 also further decreases the concentration of $H_2S$ in the NCG so that the typical remaining gaseous constituent (e.g., at sensor 371 is primarily $CO_2$. This purified gas via valve 38 might be able to supplement or replace commercially supplied gas used in the power plant or offsite. For example, the treated NCG via valves 38 and 39 could be used to "blanket" (prevent air contact with) fluids in clarifiers or other low pressure vessels in the power plant or elsewhere. The treated NCG via control valves 38, 39, and 40 may also now be used as a purge gas or injected geothermal or oil bearing formations to stimulate production, replacing a commercial source of $CO_2$ or other solvents. Treated NCG injection may prevent calcite and/or sulfide scaling and decrease the pH to control silica scale in the produced geothermal brine. If the NCG before treatment were injected, the $H_2S$ constituent may cause unwanted precipitation and scaling in the geothermal or other subsurface formation. Injection of the treated NCG would also nearly eliminate all gaseous emissions from a geothermal power plant.

The treated NCG (typically containing less than 100 ppm $H_2S$, less than 10 ppm ammonia, and less than 1 ppm boron) from mixer 15 received via valve 38 may also be commercially useful as a "$CO_2$ process feed" to processes such as dry ice or methanol production, otherwise unrelated to geothermal power production. The treated NCG may also be pressurized or sold offsite as a commercial grade of $CO_2$, assuming purity requirements are satisfied.

If the end use for the treated water is not for irrigation (or the ammonia content is excessive even for irrigation use), excess ammonia can be removed from the aqueous stream via control valve 14 by directing it over an "adsorbent, e.g., an acid form of an ion exchange resin or sieve, in vessel 20. Although FIG. 1 shows the source of the aqueous stream to adsorption vessel 20 downstream of heat exchanger 19, alternatively, the aqueous stream feeding the adsorption vessel 20 may bypass the heat exchanger 19.

The ammonia is adsorbed in the resin of vessel 20 until the resin needs to be rejuvenated. The water contacting of the ammonia-retaining resin tends to form ammonium carbamate and related compounds. Urea or a urea solution may also be added as a reactant at control valve 21 to increase ammonia solubility and improve the adsorption process. In order to achieve continuous operation, several parallel resin-containing vessels 20 may be used, so that one can be rejuvenated while another is removing ammonia.

In other resin applications in the past, periodic rejuvenation used a strong concentrated acid, such as hydrochloric or sulfuric. The resulting ammonia sulfate (or ammonia chloride) was an effluent which was disposed of after rejuvenation of the resin.

However, in the present invention, rejuvenation can be accomplished by contacting the resin with a pressurized solution of $CO_2$ (or liquified carbon dioxide) derived from the process, forming a regenerant. The regenerant can also be used to enrich the condensate, rather than being discharged as an effluent.

The need for periodic rejuvenation is detected by an ammonia (and possibly other constituent) sensor 21*a*. If rejuvenation is needed, resin-containing vessel 20 is isolated and control valve 22 and pump or blower 23 are actuated to purge the resin. The purging of the resin continues until the resin is rejuvenated. Purging is also dependent upon the resin selected. Selection of the resin is based upon operating conditions, but an example of one suitable resin is a polyacrylic weakly cation exchanger which can be obtained from Rohm & Hass as Duolite C-464.

The discharged ammonia-enriched regenerant from vessel 20 can provide a feed stream to the ammonia-enriching mixer vessel 15. This may require additional reactants to allow the ammonia to be transferred and fixed in the aqueous mixture. The regenerant (from vessel 20), further enriches the aqueous mixture in vessel 15, producing an irrigation/fertilizer feed. The ammonia-lean, primarily $CO_2$ vapor is discharged via control valve 38 as a commercially useful process feed (as previously discussed). The regenerant may also be discharged or recycled upstream for additional treatment.

If excessive ammonia (or related compounds) are still detected in the treated condensate mixture by sensor 21*a*, additional ground or surface water may be added by control valve 24 or a biocide injected as a reactant at control valves 25 through 28. The biocide (or cooling tower discharge treated with the biocide) further reduces the ammonia concentration, as described in U.S. Pat. No. 5,032,284, which is incorporated by reference herein its entirety. Other materials may also be used to reduce ammonia concentrations, such as molecular sieves or other adsorbents. In addition, NaOCl and NaOH would tend form $N_2H_4$ (hydrazine) and nitrifying bacteria would tend to form nitrites and nitrates, further decreasing unwanted nitrogen-containing compounds.

By allocating a portion of the treated aqueous stream to a selected end use, such as purge water, higher levels of ammonia may be accepted without further treatment. Thus, depending upon sensor 21 data, different amounts of ground or surface water and/or reactants would be required for different uses. Simultaneous uses could also be accommodated by control valves 29, 30 and 31. Although many options are possible, specific end use limitations may result in a greatly simplified sensor, valve, and control system.

Similarly, ammonia can also be removed from the NCG stream from control valve 16 by means of adsorption in a membrane or resin-containing vessel 32. A portion of the treated condensate mixture or other water (shown as "purge water" entering adsorption vessel 32 in FIG. 1) is supplied to provide a clean aqueous media for the resin. Purge water discharged from the resin-containing vessel 32 via control valve 39 is enriched in $CO_2$ and ammonium ions. The $CO_2$ assists in fixing the ammonia as ammonium ion for irrigation use. The enriched water is directed to irrigation use through control valve 42.

Rejuvenation of the resin is accomplished by periodically recycling the output (treated) NCG stream via control valves 33 and 35 to the vessel 32. A pH control additive or other reactant may be added at control valve 35 (which is controlled by a programmable controller based upon data from sensor 36) to improve the rejuvenation process. Depending upon the resin's rejuvenation requirements, the recycled NCG stream (consisting essentially of $CO_2$) may also need to be cooled, pressurized, and/or liquified.

The concentrations of one or more constituents of the treated NCG downstream of control valve 33 are detected by sensor 37. If the detected concentrations are acceptable for one or more commercial uses, a programmable controller (not shown for clarity) actuates control valves 38, 39, and 40 to supply these commercial uses.

One minor constituent of both the "NCG" and "condensate" streams may also be boron. Boron may be detected by one or more sensors, especially sensor 41. In small concentrations, boron (less than about one ppm) in irrigation waters is considered a micronutrient. However, higher levels can be toxic to sensitive crops, such as barley and cucumbers. Thus, the boron levels in treated surface water or surface water/condensate mixtures may be measured and controlled if they are to be used for irrigation, especially if the waters are to be used For sensitive crops. Other properties and constituents that may be monitored include chloride, pH, and conductivity.

If the measured boron concentration by sensor 41 is too high for the intended use of the treated water, various control valves can be adjusted or reactants added to reduce the boron concentration in the treated water. Surface waters are typically low in boron, and increasing the surface water flowrate (as a percentage of the treated water stream flowrate) using control valve 24 serves to dilute boron concentration in addition to further oxidizing any remaining $H_2S$ in the stream. Changing the pH (e.g., adding an acid as an additive or reactant) and/or altering the temperature of one or more streams (e.g., using heat exchangers 18 and 19) may also assist in controlling boron concentrations, especially if boron-controlling reactants or additives are used. Finally, control valve 42 can be used to divert high boron concentration water to a special irrigation stream (i.e., irrigating only less sensitive crops, such as certain landscape plants and asparagus), allowing treated water having boron concentrations greater than 1 ppm to be commercially useful.

An ion exchange resin within an resin-containing vessel (not shown in drawing) is an alternative means for removing boron ions, similar to the previous discussion of adsorption resins for removing ammonia. An example of a boron-adsorbing resin is Amberlite IRA-743 supplied by Rohm & Hass. Periodic regeneration is typically accomplished with HCl. The resulting regenerant solution (from the resin) is laden with boric acid. The regenerant solution can be partially evaporated to yield boric acid, a salable product.

Still another possible minor constituent that may require monitoring, especially when condensate is used for irrigation or as a potable water supply, is arsenic. If sensors, sensor 41 in particular, indicate that a decrease in arsenic concentration is required, the addition of a reactant at control valve 34 can reduce and control this constituent. One example of such a reactant is a specific type of oxidizing agent described in U.S. Pat. No.

5,024,729, issued on Jun. 18, 1991 (Gallup), which is incorporated by reference herein in its entirety.

The sensors, optional flow paths, control valves, and integration of treatments can result in the production of a variety of useful fluid streams, instead of the prior art single use (of condensate) and discharge of remaining power plant streams. The condensate stream requires less treatment (e.g., inhibitors) for cooling tower makeup use. More importantly, new uses for the condensate, condensate mixtures, and NCG streams are now possible. Mixing partially concentrated condensate (i.e., blowdown) with surface water adds to the water supply, oxidizes $H_2S$ in the condensate, reduces the dissolved salt levels when compared to the surface water by itself, and enriches the mixture for fertilizer and irrigation use. Treated condensate or condensate mixtures can now also be used for drinking water. The treated NCG, now mostly $CO_2$, is no longer required to be discharged to the atmosphere, but can be used within the power plant, used to stimulate fluid production by injection, and/or used as a feed to another commercial process.

Although the maximum and minimum process temperatures and pressures are theoretically unlimited, the streams are typically within a temperature range from about 32° to 212° F. (0° to 100° C.), preferably within the range from about 50° to 150° F. (10 to 65.6° C.), and most preferably within the range from about 75 to 100° F. (23.9 to 37.8° C.). The condensate and NCG pressure range may be from about near vacuum conditions to 100 psig (0 to 7.80 atm), preferably within the range from about 0 to 80 psig (1 to 6.44 atm), and most preferably within the range from 15 to 60 psig (2.02 to 5.08 atm).

Still other alternative embodiments are possible. These include: integrating the disclosed condensate, blowdown, and NCG treatment processes with a power plant using once-through or partial dry cooling (instead of 100% evaporative cooling), reducing the need for concentrating condensate and increasing the amount of treated water provided for agricultural use; adding a condenser/cooler downstream of the steam ejector 2 and separately condensing the motive "steam" (providing an added source of "condensate"); combining one or more mixing and heat exchange functions in one vessel; integrating the output of a liquid $CO_2$/dry ice production process to provide liquid $CO_2$ at control valve 35 (for rejuvenating the resin in vessel 32); integrating the effluent treatment process for several geothermal power plant effluent streams; simultaneously accomplishing the decrease of one constituent with the enrichment of another constituent within a single vessel; and having multiple stages of each constituent control or enrichment steps.

The invention is further described by the following example(s) which are illustrative of specific modes of practicing the invention and are not intended as limiting the scope of the invention as defined by the appended claims. The examples are derived from testing of geothermal brines, condensates, non-condensable gas streams, and cooling tower vent gas streams at Salton Sea Unit 2, a geothermal power plant operating near the Salton Sea, Calif.

EXAMPLE 1

A NCG power plant gas effluent stream from a geothermal condensate was analyzed and found to comprise about 99% $CO_2$, 0.4% $H_2S$, and 0.6% $NH_3$ and hydrocarbons such as methane. The corresponding "Condensate" from the condenser was as shown in Table 1. "Surface" water (class 1 irrigation water from the Vail canal) analysis was as shown in Table 1. It appears that a majority of the $H_2S$ and $NH_3$ from the flashed brine partitioned to the condensate. After the NCG stream was pressurized and contacted with oxygenated cooling tower water, the stripped gas contained 99.8% $CO_2$ and less than 60 ppm $H_2S$.

Mixing of the condensate and surface waters in equal parts significantly reduces the concentration of certain saline constituents commonly found in surface waters, as shown in Table 1. The results of applying this mixture and each of the waters separately to a field planted with cucumbers are shown in Table 2. The corresponding results of applying this mixture to a field planted with barley are shown in Table 3.

TABLE 1

| PROPERTY/ CONSTITUENT | CONDENSATE | EQUAL MIXTURE | SURFACE WATER |
|---|---|---|---|
| pH | 9.3 | 9.3 | 8.6 |
| Cl | 1 | 60 | 120 |
| Ca | <1 | 48 | 90 |
| K | <1 | 9 | 15 |
| Mg | <1 | 16 | 35 |
| Na | <1 | 75 | 140 |
| $CO_3$ | 360 | 90 | — |
| $HCO_3$ | — | 140 | 95 |
| OH | 50 | — | — |
| $NH_3$ | 270 | 140 | 1 |
| $SO_4$ ($H_2S$) | 52 | 200 | 330 |

TABLE 2

| DAYS AFTER PLANTING | CUCUMBER ANALYSIS -HEIGHT, INCHES, AFTER IRRIGATION WITH- | | |
|---|---|---|---|
| | CONDENSATE | EQUAL PARTS | SURFACE |
| 8 | 0.25 | 2.5 | 1.5 |
| 15 | 2.75 | NA | NA |
| 22 | 3.75 | 6.0 | 3.5 |
| 36 | 9.0 | 13.0 | 4.0 |

TABLE 3

| DAYS AFTER PLANTING | BARLEY ANALYSES -HEIGHT, INCHES, AFTER IRRIGATION WITH- | | |
|---|---|---|---|
| | CONDENSATE | EQUAL PARTS | SURFACE |
| 7 | 5.5 | 5.25 | 5.5 |
| 14 | 7.75 | 8 | 7.75 |
| 21 | 8.75 | 8.75 | 7.75 |
| 35 | 12.5 | 12 | 11 |
| 42 | 12.5 | 13 | 11 |

The cucumber and barley analysis of Tables 2 and 3 show the advantages of using mixed treated condensate and surface waters rather than either one for irrigation. The growth of both crops using mixed water was substantially better than the growth using surface water, the normal irrigation water used in the area. The growth of cucumbers using mixed water was clearly better than either source of water.

EXAMPLE 2

In another series of tests, treated water contacting of a non-condensable vent gas stream from a geothermal power plant located near the Salton Sea, Calif., was accomplished. Counter-current contacting was accomplished in a glass column packed with plastic mesh where various waters were introduced at the top of the column and the NCG was introduced near the bottom, just above a maintained liquid level. $H_2S$ at the top gas outlet was measured with a Jerome 631 analyzer.

Figure 2:
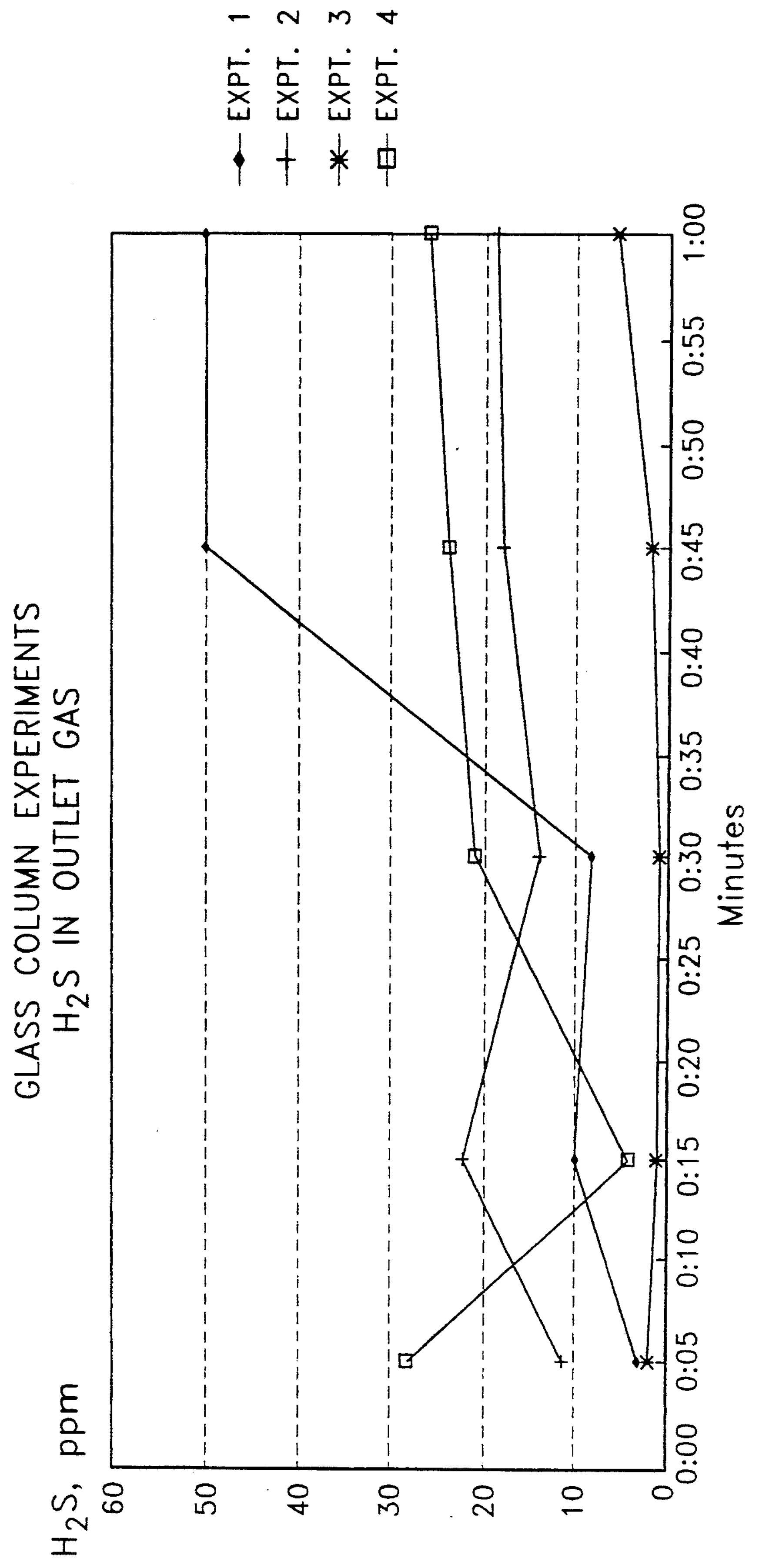
FIG. 2 shows the results of experiments contacting treated water with a geothermal non-condensable gas stream.

Experiment 1 contacted untreated surface water (from the New River) against NCG containing 3500 ppm $H_2S$ and the detected $H_2S$ at the outlet over time is shown in FIG. 2. Although the uptake of $H_2S$ by the untreated (oxygen-containing) water was initially significant, more $H_2S$ was detected at later times, i.e., the uptake of $H_2S$ decreased with time. Analysis of the water indicated that the pH had decreased from an initial 6.8 to 5.8, because of the uptake of $CO_2$ and $H_2S$ in the NCG stream. Removal of $H_2S$ appeared to be a result of oxidation and scrubbing.

Experiment 2 contacted surface water (from the New River) water against essentially the same NCG stream, but maintained the pH at 7.0. This was accomplished by controlled additions of ammonium hydroxide. The results (shown on FIG. 2) indicated a quick breakthrough of $H_2S$, but some reduction in the total amount of $H_2S$ at the outlet over the entire test period was observed.

Experiment 3 was similar to experiment 2 except that an oxidizing biocide (TCIA) was also added. Since TCIA is an acidic compound, more ammonium hydroxide was needed to maintain the pH. The results, as shown on FIG. 2, indicated very little $H_2S$ escaped to the outlet. Analysis of the water indicated improved oxidation compared to experiments 1 and 2.

Experiment 4 replaced the TCIA with a bleach and compared the oxidation efficiency of a bleach against the oxidizing biocide. The amount of bleach was chosen to be approximately equivalent in available chlorine in the TCIA of experiment 3. The results, as shown in FIG. 2, indicate poor oxidation efficiency, approaching that of untreated water.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A process for treating geothermal steam stream comprising $H_2O$, $H_2S$, and ammonia or ammonium ion constituents, said process comprising:

condensing less than all of said geothermal steam stream at a first pressure, producing a non-condensed gas stream and a condensate liquid stream, said non-condensed stream comprising a portion of said $H_2S$ and ammonia or ammonium ion constituents and said condensate stream comprising the remaining constituents;

increasing the pressure to a second pressure on said non-condensed stream;

adding an $H_2S$ reactant to at least a portion of the pressurized non-condensed stream in an amount sufficient to react with a substantial amount of the $H_2S$ therein, forming a reacted vapor stream; and contacting at least a portion of said reacted vapor stream with an absorptive material for removing at least a portion of said ammonia or ammonia ions, thereby forming a treated vapor stream wherein said contacting step also comprises contacting at least a portion of said reacted vapor stream with at least a portion of said condensate stream, said contacted condensate stream forming an ammonia- or ammonium ion-enriched aqueous stream suitable for irrigation of crops.

2. The process of claim 1 wherein said process also comprises the steps of:

increasing the pH of said condensate stream portion prior to said contacting step; and removing a substantial amount of said $H_2S$ constituent from the pH-increased condensate stream portion to form a pretreated condensate stream prior to said contacting step.

3. The process of claim 2 wherein said step of contacting also condenses a portion of said $H_2O$ constituent and said contacting is sufficient to significantly decrease the ammonia or ammonium ion concentration in said treated vapor stream.

4. The process of claim 3 which also comprises the step of converting at least a portion of the energy of said geothermal steam stream to work prior to said condensing step.

5. The process of claim 1 wherein said contacting step comprises:

first contacting at least a portion of said reacted vapor stream against an adsorbent and adsorbing at least a portion of said ammonia or ammonium ion constituent of said reacted vapor stream to produce said treated vapor stream; and periodically contacting at least a portion of said treated vapor stream and an aqueous stream against said adsorbent, transferring at least a portion of the adsorbed ammonia or ammonium ions to said periodically contacted streams to produce a regenerant stream.

6. The process of claim 5 which also comprises:

blending an aerated water stream with at least a portion of said condensate stream prior to said transferring step;

first mixing at least a portion of said regenerant stream with at least a portion of said condensate stream to form a mixed stream; and second mixing at least a portion of said mixed stream with at least a portion of said condensate stream after said transferring step.

7. The process of claim 6 wherein said reactant is selected from the group consisting of oxygen, chlorine, bromine, ozone, iron chelates, trichloroisocyanuric acid, sulfur dioxide, and mixtures thereof, said process also comprising the step of irrigating an agricultural crop with at least a portion of said mixed stream.

8. The process of claim 7 which also comprises steps of:

second contacting at least a portion of said condensate stream against an ammonia or ammonium ion adsorbent to form a treated condensate stream;

periodically contacting at least a portion of said treated vapor stream and said treated condensate stream against said adsorbent, transferring at least a portion of said absorbed ammonia or ammonium ions to the periodically contacted streams to produce a second regenerant stream; and mixing at least a portion of said second regenerant stream with at least a portion of said condensate stream.

9. The process of claim 8 which also comprises the step of blending at least a portion of said treated condensate stream with a second aqueous source stream not derived from a geothermal source, forming a blended aqueous mixture.

10. The process of claim 9 wherein said second aqueous source is a ground water which contains contaminants making it substantially unsuitable for consumptive commercial use.

11. The process of claim 10 which also comprises the step of supplying at least a portion of said blended mixture to a consumptive commercial use.

12. The process of claim 11 wherein said consumptive commercial use is a potable water delivery system.

13. The process of claim 12 wherein said adding step also comprises injecting a reactant into at least a portion of said condensate stream.

14. The process of claim 13 which also comprises the steps of:

evaporating at least a portion of said treated condensate stream in a cooling tower to produce at evaporate stream; and supplementing said condensate stream with at least a portion of said evaporate stream prior to said second contacting step.

15. A process for treating geothermal steam stream comprising $H_2O$, $H_2S$, and ammonia or ammonium ion constituents, said process comprising:

condensing less than all of said geothermal steam stream at a first pressure, producing a non-condensed gas stream and a condensate liquid stream, said non-condensed stream comprising a portion of said $H_2S$ and ammonia or ammonium ion constituents and said condensate stream comprising the remaining constituents;

increasing the pressure to a second pressure on said non-condensed stream;

adding a $H_2S$ reactant to at least a portion of the pressurized non-condensed stream in an amount sufficient to react with a substantial amount of the $H_2S$ therein, forming a reacted vapor stream;

contacting at least a portion of said reacted vapor stream with an absorptive material for removing at least a portion of said ammonia or ammonia ions, thereby forming a treated vapor stream wherein said contacting step comprises contacting at least a portion of said reacted vapor stream with at least a portion of said condensate stream, wherein said contacting step comprises:

first contacting at least a portion of said reacted vapor stream against an adsorbent and adsorbing at least a portion of said ammonia or ammonium ion constituent of said reacted vapor stream to produce said treated vapor stream; and periodically contacting at least a portion of said treated vapor stream and an aqueous stream against said adsorbent, transferring at least a portion of the adsorbed ammonia or ammonium ions to said periodically contacted streams to produce a regenerant;

blending an aerated water stream with at least a portion of said condensate stream prior to said transferring step;

first mixing at least a portion of said regenerated stream with at least a portion of said condensate stream to form a mixed stream;

second mixing at least a portion of said mixed stream with at least a portion of said condensate stream after said transferring step, wherein said reactant is selected from the group consisting of oxygen, chlorine, bromine, ozone, hydrogen peroxide, iron chelates, trichloroisocyanuric acid, sulfur dioxide, and mixtures thereof;

irrigating an agricultural crop with at least a portion of said mixed stream;

second contacting at least a portion of said condensate stream against an ammonia or ammonium ion adsorbent to form a treated condensate stream;

periodically contacting at least a portion of said treated vapor stream and said treated condensate stream against said adsorbent, transferring at least a portion of said absorbed ammonia or ammonium ions to the periodically contacted streams to produce a second regenerant stream;

mixing at least a portion of said second regenerant stream with at least a portion of said condensate stream;

blending at least a portion of said treated condensate stream with a second aqueous source stream not derived from a geothermal source, forming a blended aqueous mixture, wherein said second aqueous source is a ground water which contains contaminants making it substantially unsuitable for consumptive commercial use;

supplying at least a portion of said blended mixture to a consumptive commercial use, wherein said consumptive commercial use is a potable water delivery system and wherein said adding step also comprises injecting a reactant into at least a portion of said condensate stream;

evaporating at least a portion of said treated condensate stream in a cooling tower to produce an evaporate stream;

supplementing said condensate stream with at least a portion of said evaporate stream prior to said second contacting step; and supplying at least a portion of said treated vapor stream as a feed to a commercial $CO_2$ consuming process.

16. The process of claim 15, wherein said $CO_2$ consuming process produces dry ice.

17. The process of claim 16 which also comprises injecting a non-heavy metal inhibitor into said treated condensate stream portion prior to said evaporating step, wherein said inhibitor comprises a phosphate and the amount of said inhibitor is less than 50 percent of the amount of inhibitor which would have been injected into said condensate stream if it had been use instead of said treated condensate stream.

18. The process of claim 17 wherein said condensate stream also comprises an arsenic constituent and said process also comprises contacting said condensate stream against an arsenic-adsorbing resin.

19. The process of claim 17 wherein said condensate stream also comprises a boron constituent and said process also comprises the steps of:

third contacting at least a portion of said condensate stream against a boron adsorbent, producing a boron-treated condensate stream;

periodically contacting an acidic aqueous stream against said boron adsorbent and transferring at least a portion of the adsorbed boron to said acid stream to produce a third regenerant stream; and evaporating at least a portion of said third regenerant stream.

20. The process of claim 19 wherein said first contacting is accomplished by countercurrent flows in a packed vessel.

21. The process of claim 20 wherein said step of increasing the pressure utilizes an ejector and comprises supplying said vapor stream as a motive fluid for operating said ejector.

22. The process of claim 21 wherein said step of increasing pressure produces a non-condensed stream pressure of at least 1 atmosphere.

23. The process of claim 22 wherein said contacting occurs at a vapor-liquid volume ratio of greater than 0.8.

24. The process of claim 23 wherein said contacting occurs at a temperature in the range from about 10° to 65° C.

25. A process for treating a condensate liquid effluent and a non-condensate gas effluent from a condenser of a geothermal process, said non-condensate effluent comprising nitrogen and sulfur constituents, said process comprising:

contacting at least a portion of said non-condensate effluent with an oxygen-containing aqueous liquid feed wherein said contacting is sufficient to oxidize a substantial amount of said sulfur constituent in said non-condensate portion;

oxidizing at least a portion of said sulfur constituent of said condensate effluent;

removing at least a portion of said nitrogen constituent from at least a portion of said non-condensate effluent;

transferring at least a portion of said removed nitrogen constituent to said oxidized condensate, forming an enriched condensate; and irrigating plants with said enriched condensate.

26. The process of claim 25 wherein said condensate effluent also comprises boron and arsenic constituents and said process also comprises:

removing at least portion of said boron constituent;

removing at least a portion of said arsenic constituent;

evaporating at least a portion of said condensate after said removing steps; and irrigating plants with at least a portion of said condensate after said evaporating step.

27. A process for treating geothermal steam stream comprising $H_2O$, $H_2S$, and ammonia or ammonium ion constituents, said process comprising:

condensing less than all of said geothermal steam stream at a first pressure, producing a non-condensed gas stream and a condensate liquid stream, said non-condensed stream comprising a portion of said $H_2S$ and ammonia or ammonium ion constituents and said condensate stream comprising the remaining constituents;

increasing the pressure to a second pressure on said non-condensed stream;

adding an $H_2S$ reactant to at least a portion of the pressurized non-condensed stream in an amount sufficient to react with a substantial amount of the $H_2S$ therein, forming a reacted vapor stream;

contacting at least a portion of said reacted vapor stream with an absorptive material for removing at least a portion of said ammonia or ammonia ions, thereby forming a treated vapor stream wherein said contacting step also comprises contacting at least a portion of said reacted vapor stream with at least a portion of said condensate stream; and supplying at least a portion of said treated vapor stream as a feed to a commercial $CO_2$ consuming process.

* * * * *

UNITED STATES PATENT AND TRADEMARK OFFICE

CERTIFICATE OF CORRECTION

PATENT NO. : 5,364,439

DATED : November 15, 1994

INVENTOR(S) : Gallup et al.

It is certified that error appears in the above-indentified patent and that said Letters Patent is hereby corrected as shown below:

Column 17, claim 14, line 16, after "produce" delete "at" and replace with -- an --; line 55 and 66, after "regenerant" add -- stream --.

Signed and Sealed this

Tenth Day of January, 1995

Attest:

BRUCE LEHMAN

*Attesting Officer* *Commissioner of Patents and Trademarks*